Dec. 9, 1958 S. V. SONMORE 2,863,328
GUIDING AND CONTROL STRUCTURE FOR POWERED
GROUND TRAVERSING IMPLEMENTS
Filed June 9, 1955
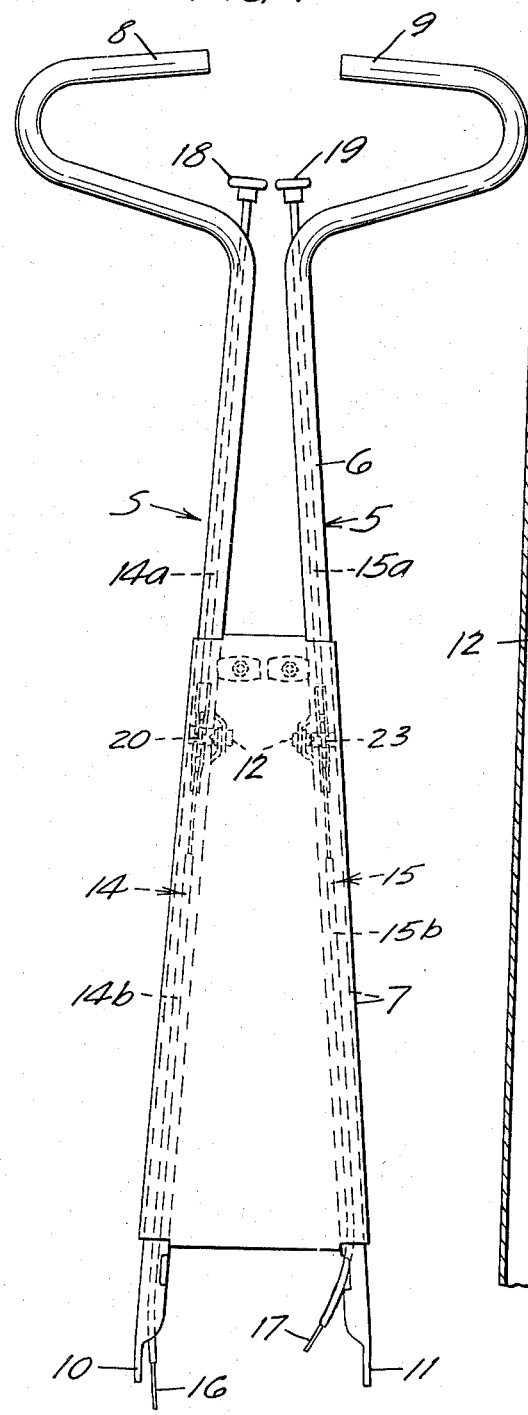
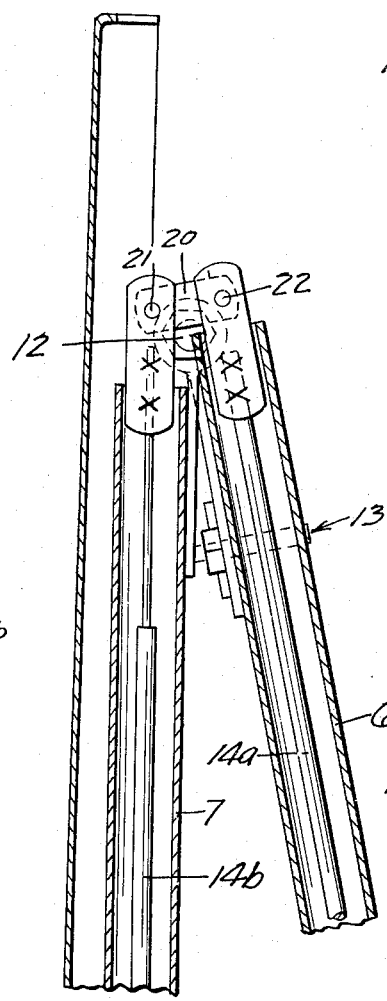
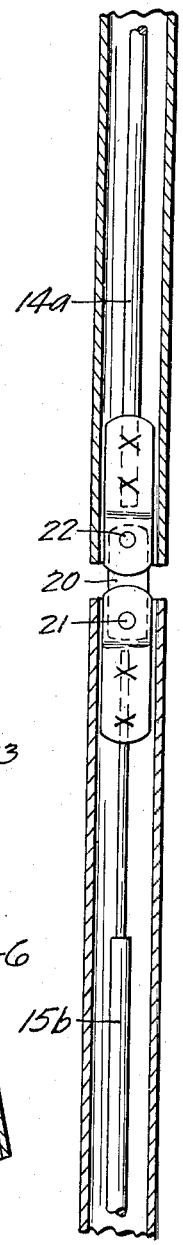
INVENTOR
STANLEY V. SONMORE
BY
Williamson, Schroeder, Adams & Meyers
ATTORNEYS United States Patent Office 2,863,328
Patented Dec. 9, 1958

2,863,328

GUIDING AND CONTROL STRUCTURE FOR POWERED GROUND TRAVERSING IMPLEMENTS

Stanley V. Sonmore, Minneapolis, Minn., assignor to Toro Manufacturing Corporation of Minnesota, Minneapolis, Minn., a corporation of Minnesota Application June 9, 1955, Serial No. 514,361

6 Claims. (Cl. 74—488)

This invention relates to control rods for powered ground-traversing implements. More particularly, it relates to control rods for powered ground-traversing implements having collapsible handles thereon.

In powered ground-traversing implements, it is necessary for handle structure to be provided in order to properly guide the unit as it moves across the ground. Such handle structure, in order to be convenient for the user, is normally elongated and extends upwardly a substantial distance to present the hand grip portions thereof and the power control knobs to the user at a comfortable level. When such a unit is not being used, however, it presents a problem of storing space, for it is difficult to collapse the handle structure into small compass without damaging the control wires which are generally of the type well-known in the art as Bowden-wire. My invention is directed toward eliminating these disadvantages.

It is a general object of my invention to provide a novel and improved combined guiding and control unit for a powered ground-traversing implement.

A more specific object is to provide a novel and improved guiding and control structure for powered ground-traversing implements which can be collapsed into small compass.

A still more specific object is to provide a novel and improved guiding and control structure for powered ground-traversing implements which may be quickly and easily collapsed into small compass without any danger of kinking or otherwise damaging the controls for the source of power.

Another object is to provide a combined guiding and control unit for a powered ground-traversing implement constructed and arranged to automatically adjust the control elements of the power unit to permit the guiding structure to be readily collapsed into small compass.

These and other objects and advantages of the invention will more fully appear from the following description made in connection with the accompanying drawings, wherein like reference characters refer to the same or similar parts throughout the several views, and in which:

Fig. 1 is a rear elevational view of one embodiment of my invention with the guiding structure in extended position;

Fig. 2 is a vertical sectional view on an enlarged scale taken through the pivot portions of the combined guiding and control unit; and Fig. 3 is a vertical sectional view on an enlarged scale taken through the pivot area of the combined guiding and control unit and showing the upper portion thereof swung to collapsed position.

One embodiment of my invention may include, as shown in Figs. 1-3, a combined guiding and control structure indicated generally as S. This structure S may include an elongated handle indicated generally as 5 having an upper portion 6 and a lower portion 7. At the free end of the upper portion 6 is a pair of hand grips 8 and 9 and the lower ends of the lower portion 7 are adapted to be connected to a ground-traversing implement such as a lawn mower as at 10 and 11. It will be noted that the handle structure 5 is of tubular construction and that the upper portion 6 and the lower portion 7 are pivotally connected by transverse pivot members such as 12. The upper portion 6 pivots about the pivot member 12 to permit the same to be swung downwardly and rearwardly to depending collapsed position, as shown in Fig. 3. Securing means indicated generally as 13 is provided for holding the upper portion 6 in aligned relation with the lower portion 7 when desired.

Extending lengthwise of the handle structure 5 through the tubular construction thereof and at both sides thereof, is a pair of Bowden-type control wires 14 and 15. These Bowden control wires 14, 15 are commonly referred to as control rods and, as can best be seen in Fig. 1, each has upper and lower portions indicated as 14a, 14b and 15a, 15b respectively. The lower portion 14b is adapted to be connected to the accelerator of the power unit as at 16. The lower end 17 of the lower portion 15b is adapted to be connected to the clutch of the power unit. The upper end of the upper portion 14a carries an accelerator control knob 18 while the upper end of the upper portion 15a carries a clutch control knob 19.

The upper portion 14a and the lower portion 14b of the control rod 14 are connected by a rigid link member 20. This rigid link member is pivotally connected at its ends to each of the upper and lower portions 14a and 14b by pivot pins 21 and 22 respectively. It will be noted that the link 20 extends upwardly above the transverse pivot pin 12 and also to a point downwardly therebelow. This link member is positioned adjacent the transverse pivot member 12 and it is sufficiently long so that it is at all times disposed opposite the transverse member 12 regardless of the position of the accelerator.

The control rod 15 has the upper and lower portions thereof pivotally connected by a link 23 which is identical in construction to the link 20 and is arranged and constructed in exactly the same manner.

In use, when it is desired to place the ground-traversing unit into storage, the securing means 13 is released and the upper portion 6 of the handle 5 is swung rearwardly and downwardly to the depending position shown in Fig. 3. As the upper portion 6 swings downwardly, the links 20 and 23 are brought into engagement with the adjacent transverse pivot members such as 12. The loss of play which results from this swinging movement is compensated for by the upward pull on the lower portion of the control rods by their respective links which will bear against the transverse members 12 and cause the accelerator and clutch of the ground-traversing unit to be adjusted to permit the lower portion to move upwardly and thereby permit the upper and lower portions of the handle member 5 to move to collapsed position. If the accelerator or the clutch control rods 14 and 15 are permitted by chance to remain disposed in a position which is not most favorable to the collapse of the handle member 5, the links 20 and 23 will cause their respective members to adjust to the necessary position as a result of their bearing against the transverse member 12. In this manner the control rods are automatically adjusted so as to eliminate any possibility of damage to them as a result of the collapsing movement of the handle structure 5.

Thus it can be readily seen that I have provided an extremely simple but novel control rod for use in conjunction with a collapsing handle for a powered ground-traversing implement which simply and efficiently removes any possibility of serious damage to the control rods as a result of the collapsing movement. Through the use of a control rod and guiding structure constructed in accordance with my invention, it is now possible to collapse the handle structure of such a powered ground-traversing unit into relatively small compass for storage. There is no danger of damage to the controls which would otherwise take place were the conventional Bowden-wire type control used throughout the length of the guiding structure.

It will, of course, be understood that various changes may be made in the form, details, arrangement and proportions of the various parts without departing from the scope of my invention.

What is claimed is:

1. In guiding and control structure for a ground-traversing implement, an elongated handle having an upper and a lower portion, connector means pivotally connecting said upper and lower portions to permit said upper portion to be swung downwardly to substantially parallel and contiguous position in order to collapse and handle into small compass storage, an elongated control element extending lengthwise of said handle and having longitudinally spaced upper and lower portions, and a link member connecting said upper and lower portions of said control element in spaced relation and pivotally connected to each adjacent said connector means whereby said handle may be collapsed without kinking damage to said control element.

2. In guiding and control structure for a ground-traversing implement, an elongated handle having an upper and a lower portion, transversely extending connector means pivotally connecting said upper and lower portions to permit said upper portion to be swung downwardly to substantially parallel and contiguous position in order to collapse said handle into small compass for storage, an elongated control element extending lengthwise of said handle and having longitudinally spaced upper and lower portions, and a link member interposed between said upper and lower portions of said control element and pivotally connected at its opposite ends to said upper and lower control element portions and holding the same in spaced relation, said link being disposed opposite said connector means and on the side thereof opposite to that toward which said upper portion swings whereby said handle may be collapsed without kinking damage to said control element.

3. In guiding and control structure for a ground traversing implement, an elongated handle having an upper and a lower portion, connector means pivotally connecting said upper and lower portions to permit said upper portion to be swung downwardly about a transverse axis to substantially parallel and contiguous position in order to collapse said handle into small compass for storage, a control rod extending lengthwise of said handle and having separate upper and lower portions longitudinally spaced from each other, and a rigid link member interposed between said upper and lower portions of said control rod and being pivotally connected to each adjacent said connector means and holding the same in spaced relation, said link member bearing against said connector means and utilizing the same as a fulcrum during movement of said handle to collapsed position whereby said handle may be collapsed without kinking damage to said control rod.

4. In guiding and control structure for a ground traversing implement, an elongated handle tubular having an upper and a lower portion, connector means pivotally connecting said upper and lower portions to permit said upper portion to be swung downwardly about a transverse axis to substantially parallel and contiguous position in order to collapse said handle into small compass for storage, a Bowden-type control wire extending lengthwise of and within said handle and having longitudinally spaced upper and lower portions, and a link member interposed between and being pivotally connected at its end portions to said upper and lower portions of said control wire adjacent said connector means and holding said portions in spaced relation, said link bearing against said connector means and utilizing the same as a fulcrum during downward pivotal movement of said upper portion of said handle and thereby adjusting said control wire whereby said handle may be collapsed without kinking damage to said control wire.

5. In guiding and control structure for a ground traversing implement, an elongated handle having an upper and a lower portion, a rigid transverse pivot member pivotally connecting said upper and lower portions to permit said upper portion to be swung downwardly to substantially parallel and contiguous position in order to collapse said handle into small compass for storage, an elongated control element extending lengthwise of said handle past said transverse pivot member and having upper and lower portions longitudinally spaced from each other, and a rigid elongated link member interposed between said upper and lower portions of said control element adjacent said connector means and being pivotally connected to said upper and lower control element portions and holding the same in spaced relation, said link member bearing against said rigid transverse pivot member and pivoting thereabout when said upper portion of said handle is swung to depending position to thereby automatically adjust said control element whereby said handle may be collapsed without kinking damage to said control element.

6. In a mowing machine handle, an elongated rigid guiding structure having an upper and a lower portion, connector means pivotally connecting said upper and said lower portions to permit said upper portion to be swung downwardly about a transverse axis to substantially parallel and contiguous position in order to collapse said handle into small compass for storage, an elongated control rod extending lengthwise of said guiding structure and having separate longitudinally spaced upper and lower portions, and a rigid elongated link member interposed between said upper and lower portions of said control rod adjacent said connector means and holding said portion in spaced relation, said link being disposed on the side of said means opposite to that toward which said upper portion swings downwardly and being pivotally connected at one of its end portions to the lower portion of said control rod and being pivotally connected at its other end portion to the upper portion of said control rod, said link extending above and below said connector means and utilizing the same as a fulcrum during movement of said guiding structure to collapsed position, whereby kinking damage to said control rod may be avoided.

References Cited in the file of this patent

UNITED STATES PATENTS

| 1,286,161 | Wagner | Nov. 26, 1918 |
| 1,870,403 | Coffing | Aug. 9, 1932 |
| 2,138,239 | Irgens | Nov. 29, 1938 |
| 2,429,378 | Stuebner | Oct. 21, 1947 |
| 2,535,615 | Van Ansdall | Dec. 26, 1950 |
| 2,585,315 | Herman | Feb. 12, 1952 |
| 2,746,315 | Ertsgaard et al. | May 22, 1956 |

FOREIGN PATENTS

| 442,982 | Italy | Dec. 3, 1948 |